United States Patent
Mo et al.

(10) Patent No.: US 7,331,527 B2
(45) Date of Patent: Feb. 19, 2008

(54) EXCEPTION REDUCTION AND EVENT REORDERING IN AN ITEM TRACKING SYSTEM

(75) Inventors: Brian S. Mo, Palo Alto, CA (US); Tao Lin, Palo Alto, CA (US); Rama Gurram, San Jose, CA (US); Richard J. Swan, Portola Valley, CA (US); Jie Weng, Sunnyvale, CA (US)

(73) Assignee: SAP Aktiengesellschaft, Walldorf (DE)

( * ) Notice: Subject to any disclaimer, the term of this patent is extended or adjusted under 35 U.S.C. 154(b) by 469 days.

(21) Appl. No.: 11/025,839

(22) Filed: Dec. 30, 2004

(65) Prior Publication Data

US 2006/0149605 A1    Jul. 6, 2006

(51) Int. Cl.
*G06K 7/10* (2006.01)

(52) U.S. Cl. ............... 235/472.02; 235/380; 235/382; 705/4; 705/38; 705/44; 705/50; 705/64; 705/75

(58) Field of Classification Search ........... 235/472.02, 235/385, 380, 382; 340/572.1, 572.8; 705/44, 705/50, 64, 75, 4, 38
See application file for complete search history.

(56) References Cited

U.S. PATENT DOCUMENTS 6,211,781 B1 * 4/2001 McDonald ................. 340/505
7,170,820 B2 * 1/2007 Szajnowski ................. 367/127
2002/0134836 A1 * 9/2002 Cash et al. ................. 235/385
2006/0022801 A1 * 2/2006 Husak et al. .............. 340/10.5
2006/0267777 A1 * 11/2006 Moore ..................... 340/572.8
2007/0085681 A1 * 4/2007 Sawyer .................... 340/572.1
2007/0103313 A1 * 5/2007 Washington ............. 340/572.8

\* cited by examiner

*Primary Examiner*—Michael G. Lee
*Assistant Examiner*—Allyson N Trail
(74) *Attorney, Agent, or Firm*—Fish & Richardson P.C.

(57) ABSTRACT

A current state of an item being tracked by an item-tracking system may be determined using prior state information about the item. To ensure proper temporal order of the state information, software events triggered by physical events associated with the item are received from a reader at an event interpretation system. A database or queue within the event interpretation system holds the software events for a delay time determined by a maximum transmission delay time of the software events. A sorter within the event interpretation system orders the software events relative to one another so as to correspond to an order of the physical events. An association model of the event interpretation system may determine state information related to the item for storage in a state information database. Accordingly, system exceptions in the item tracking system may be reduced, and an accuracy and reliability of the system may be improved.

18 Claims, 4 Drawing Sheets

EXCEPTION REDUCTION AND EVENT REORDERING IN AN ITEM TRACKING SYSTEM

TECHNICAL FIELD

This invention relates to item tracking systems.

BACKGROUND

Conventional auto-identification (auto-id) systems exist for providing an awareness of a status, identity, or location of each of a plurality of items. For example, Radio Frequency Identification (RFID) tags may be attached to each of a plurality of items, so that RFID readers may be used to detect the tags, and thereby provide information about the items that may be used in, for example, tracking the items between and among manufacturing, warehouse, and retail sales environments.

Such item tracking systems may provide many advantages in, for example, making, shipping, storing, and selling items. For example, items in a retail store may be automatically tracked as they are moved from a shelf and/or transported out of the store by purchasing customers. Then, software associated with the auto-id system may determine that additional units of the items should be re-located from storage (or re-ordered from a manufacturer) to replace the sold item(s) on the shelf.

An advantage of such auto-id systems typically lies in the fact that auto-id tags attached to the items are very small and relatively inexpensive. Accordingly, the auto-id tags are not typically designed to provide extensive information about the items to which they are attached. As a result, it may be difficult to derive or determine certain types of information about the items. Accordingly, conventional auto-id systems may not be able to provide desired information, and/or may be prone to experiencing system exceptions, inconsistencies, or other malfunctions.

SUMMARY

According to one general aspect, a system includes a delay determination system operable to associate a delay time with a first software event received and a second software event, where the first software event and the second software event provide information about a first physical event and a second physical event, respectively, associated with an item, a sorter operable to temporally order the first software event and the second software event, after waiting the delay time, so that the first software event and the second software event are ordered so as to correspond to an order of occurrence of the first physical event and the second physical event, and an association model operable to determine a state of the item, based on the order of occurrence.

Implementations may include one or more of the following features. For example, the delay time may be determined based on a maximum delay time between generation and reception of the first and second software events. The delay time also, or alternatively, may be determined based on a minimum delay time between generation and reception of the first and second software events.

The first software event and the second software event may be received from a first reader and a second reader that may be operable to read a tag associated with the item, in association with the first physical event and the second physical event, respectively. In this case, the delay time may be determined based on a minimum time needed to physically move the item from the first reader to the second reader, and the first reader and the second reader may include Radio Frequency Identification (RFID) readers.

A queue may be included in which the first software event and the second software event are held after ordering by the sorter, for passing therefrom to the association model. A memory may be included that is operable to hold the first software event and the second software event until the delay time has passed for each software event, and may be further operable to pass the first software event and the second software event to the sorter once the delay time has passed for each software event.

A state database may be included for storing the state of the item as determined by the association model. The first physical event and the second physical event may include movement of the item from a first location to a second location.

According to another general aspect, a first software event corresponding to a first physical event is received, a delay time is associated with the first software event, a second software event corresponding to a second physical event is received, and the delay time is associated with the second software event. The first software event and the second software event are held for the delay time, and the first software event and the second software event are ordered relative to one another, so as to correspond to an order of occurrence of the first physical event and the second physical event.

Implementations may include one or more of the following features. For example, state information regarding an item affected by the first physical event and the second physical event may be determined, based on the ordering of the first software event and the second software event. The delay time may be determined based on one of a maximum transmission time of the first software event and the second software event delay, and a minimum transmission time of the first software event and the second software event delay.

The first physical event and the second physical event may relate to movement of an item being tracked by an item-tracking system. In this case, the delay time may be determined based on a minimum time necessary to complete the movement of the item.

According to another general aspect, an apparatus has a storage medium with instructions stored thereon, and the instructions include a first code segment for receiving a plurality of software events, the software events corresponding to a plurality of physical events, a second code segment for assigning a delay time to each of the software events, the delay time being based on a maximum delay time associated with transmission of any one of the software events, and a third code segment for ordering the software events relative to one another, based on the delay time.

Implementations may include one or more of the following features. For example, the instructions may include a fourth code segment for receiving the ordered software events and for determining an order of occurrence of the physical events based on the ordered software events, and a fifth code segment for determining state information of an item affected by the physical events, based on the order of occurrence.

The third code segment may include a fourth code segment for ordering a first subset of the software events relative to one another a fifth code segment for ordering a second subset of the software events relative to one another, and a sixth code segment for ordering the first subset relative to the second subset. In this case, the first subset may be associated with a first geographical location, and the second subset may be associated with a second geographical location that is remote from the first geographical location. Additionally, or alternatively, the second code segment may include a fourth code segment for reducing the delay time based on a minimal transmission delay that is common to all of the software events.

The details of one or more implementations are set forth in the accompanying drawings and the description below. Other features will be apparent from the description and drawings, and from the claims.

DETAILED DESCRIPTION

Figure 1:
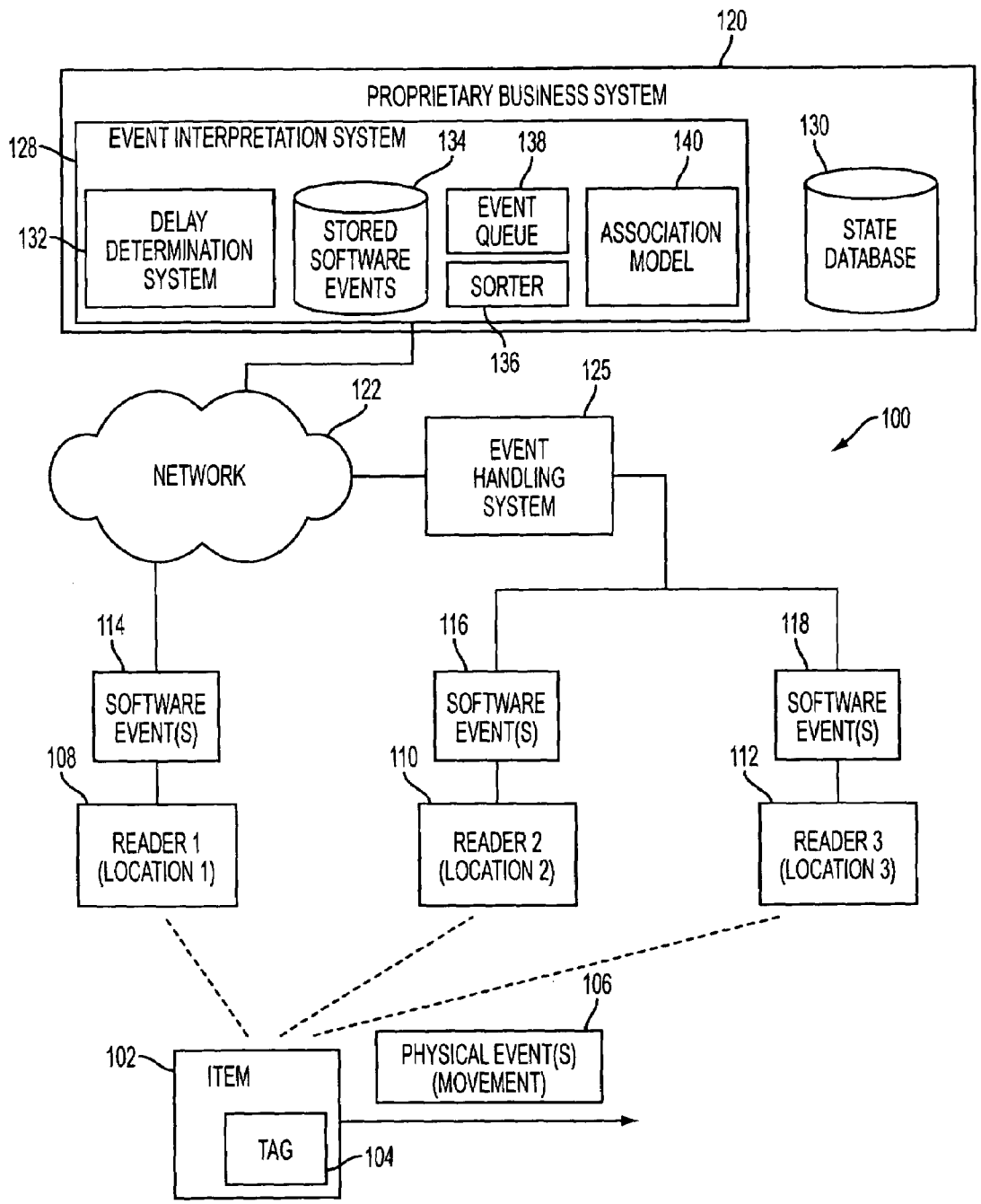
FIG. 1 is a block diagram of an auto-identification (auto-id) system.

FIG. 1 is a block diagram of an auto-identification (auto-id) system 100. In FIG. 1, an item 102 having an attached tag 104 experiences a physical event 106. For example, the item 102 may be virtually any type of item that may be made, shipped, stored, or sold as part of a product supply chain. Such a product supply chain may include, for example, manufacturing, warehouse, or retail sales environments, and these environments are used for the sake of discussion in the examples given below.

However, it should be understood that similar comments apply to any item that may be tracked by an auto-id system, and not just to items that are ultimately intended for retail sale. For example, within a manufacturing environment, the item 102 may represent a manufacturing tool, such as, for example, a piece of transport or assembly equipment. Similarly, within a warehouse environment, the item 102 may represent an item associated with storage, such as, for example, a pallet or container.

Moreover, it should be understood that the auto-id system 100 of FIG. 1 may be used outside of a product supply chain environment, and may be used whenever it is desired to track a status or location of a tagged item. For example, the item 102 may represent an automobile that is tracked through various toll booths, for the purpose of collecting tolls and/or issuing speeding tickets.

Still further, it should be understood that the item 102 may represent a single item, such as might be sold at a retail level, or may represent a case, package, pallet, shipment, or other grouping of items, including, for example, multiple different types of retail items. The item 102 also may be referred to, for example, as an object or a physical object.

The tag 104 may represent any type of tag or identification system that provides for automatic reading and tracking of the item 102. In the examples given below, the tag 104 is described as a Radio Frequency Identification (RFID) tag. However, various other types of auto-id tags may be used. For example, RFID tags, which generally rely on passive reception of transmitted radio-frequency signals, may be impractical in association with items containing materials that reflect or absorb such signals, such as, for example, water or certain metals. In these situations, or in other situations, the tag 104 may represent a tag that is operable to actively transmit an identification signal, in the radio frequency range or in some other frequency range. More generally, the tag 104 may represent any tag or label (e.g., bar code label) capable of automatically identifying itself in response to a query, and may use any frequency range, including optical frequencies, to do so.

The physical event 106 is generally discussed herein as a movement or motion of the item 102. However, it should be understood that virtually any physical event may be represented by the physical event 106, and that a nature of the physical event 106 may be dependent on the type or nature of the item 102.

For example, the physical event 106 may represent a current state of the item 106, such as, for example, a state of assembly of the item 106. The physical event 106 also may represent a change in status of the item 102. For example, an item for sale in a retail environment may stay in a single location, but may be re-classified from "full price" to "half-price." Such a change in status may be implemented by, for example, an actual change of the tag 104 to another tag having different characteristics, or by re-programming the tag to reflect the change.

In the example of FIG. 1, a first reader 108, a second reader 110, and a third reader 112 are all operable to read the tag 104, when the tag 104 is within a pre-determined operating range, and thereby detect movement or other information about the tag 104 and the item 102. More specifically, each of the readers 108, 110, and 112 is operable to determine that the tag 104 is within a reading range, but the readers 108, 110, and 112 are not generally capable of determining other types of information related to the physical event 106.

For example, the reader 110 may detect that the item 102 has moved within a reading range at a given point in time. However, by itself, the reader 110 is not capable of determining a direction of the movement of the item 102. That is, the reader 110 is not generally capable of determining whether the item 102 has moved to within a reading range from a direction of the reader 108, a direction of the reader 112, or from some other direction.

For example, the reader 110 may be positioned between a first location and a second location. With knowledge of this positioning, outputs of the reader 110 may be interpreted as providing information that the item 102 has been moved between the first and second locations. Even with this information, however, an output of the reader 110 does not, by itself, provide information about whether the item 102 has been moved from the first location to the second location, as opposed to being moved from the second location to the first location.

In other words, the physical event 106, in order to be meaningful or useful in a particular setting, may require some degree of interpretation. This need for interpretation is consistent with the fact that the tag 104, in order to be kept small and inexpensive, generally stores only a minimum amount of information about the item 102.

In order to generate an output signifying a reading of the tag 104, and to thereby facilitate interpretation of the physical event 106, each of the readers 108, 110, and 112 generally generates a software event(s) that corresponds to the physical event, whenever the item 102 moves within a reading range of a particular reader (or otherwise triggers a reading). In FIG. 1, the reader 108 generates a software event 114, the reader 110 generates a software event 116, and the reader 112 generates a software event 118.

These software events 114, 116, and 118 are received at an information system 120, which interprets the software events 114, 116, and 118 to determine information about the item 102 and the physical event 106. That is, as described in more detail below, the information system 120 uses the software events 114, 116, and 118 to properly update information about the item 102, and to make corresponding business decisions regarding the item 102. For example, the information system 120 may determine that the item 102 has been purchased and removed from a retail store, and may accordingly determine that additional units of the item 102 should be ordered from a manufacturer.

In FIG. 1, the software events are transmitted over a network 122. The network 122 may represent one or more of, for example, a public or private network, which may be a wide area network or a local area network. Of course, one or more of the software events 114, 116, and 118 may be directly transmitted to the information system 120, as well.

In FIG. 1, the software event 116 and the software event 118 are processed by event-handling software 125 before being transmitted over the network 122. In this way, the software events 116, 118 may be "batch-processed" by the event-handling software 125.

For example, the event-handling software 125 may be used to remove extraneous information, if any, from the software events 116, 118, or may be used to filter one of the software events 116, 118 entirely, or may be used to add additional information to the software events 116, 118 (e.g., messaging protocol information).

In modifying the software events 116, 118, the event-handling software 125 may provide a useful service. Moreover, by modifying and/or transmitting the software events 116, 118 in batches, an efficiency of the event-handling software 125 may be increased. Nonetheless, the presence of the event-handling software 125, as discussed in more detail below, also may add an additional layer of difficulty in interpretation of the software events 114, 116, and 118 by the information system 120.

One example of the event-handling software 125 includes software related to techniques for accessing information about the item 102 over the network 122, using an Electronic Product Code (EPC) associated with the item 102 by the tag 104. Such an approach has been developed by the Auto-ID Center associated with the Massachusetts Institute of Technology and other university and industry participants, for the purpose of tracking useful information about very large numbers of items 102. However, other middleware software also may be used.

As explained above, the software events 114, 116, and 118 provide information about the physical event(s) 106, and are transmitted to the information system 120 by various routes and techniques, for interpretation of this information. The information system 120 interprets a particular software event, such as the software event 116, using other relevant information, such as, for example, stored information about the item 102, or information from other software events 114, 118.

In the example of FIG. 1, the information system 120 contains an event interpretation system 128 that is operable to perform the interpretation functions just referred to, in conjunction with a state database 130. The state database 130 stores information about the item 102, such as, for example, state information including a current or previous location of the item 102, or information describing characteristics or features of the item 102.

In some instances, an order of arrival of the software events 114, 116, and 118 at the event interpretation system 128 may not be significant. For example, if the readers 108, 110, and 112 are all co-located within a warehouse environment, the item 102 may represent a container being used by a worker as the worker selects items from the warehouse shelves for shipment to a retail store. As long as the worker selects all of the required items for shipping, knowledge about an order of selection of the items (and corresponding movement of the container 102) may not be required (although such information may be useful if the route of the worker through the warehouse is to be optimized for efficiency).

In many instances, however, the order of arrival of the software events 114, 116, and 118 at the event interpretation system 128 may be instrumental in interpreting the physical event 106. For example, the physical event(s) 106 may correspond to a reception of the item 102 at a warehouse door (signified by the software event 114) and placement of the item 102 at an appropriate location within the warehouse (signified by the software event 116).

If the software event 114 is delayed in its transmission due to delays in the network 122, such that the software event 116 is received at the information system 120 prior to the software event 114, then the event interpretation system will detect that the item 102 is located within the warehouse without having been received at the warehouse door. Consequently, the software event 116 may be deemed to be in error, or some other system exception may occur, so that costly and time-consuming manual intervention may be required.

Based on the above, it should be understood that interpretation of a current state of the item 102 may depend on other, time-sensitive information, including, for example, an immediately prior state of the item 102. Therefore, if a delivery of software events 114, 116, or 118 is delayed or otherwise incorrectly ordered, then the information system 120 may not have sufficient information to correctly interpret the software events 114, 116, and 118 for deriving information about the physical event(s) 106.

An order of arrival of the software events 114, 116, and 118 at the event interpretation system 128 may be incorrect for a number of reasons. As already referred to, for example, delays associated with the network 122 or the event-handling software 125 may result in an incorrect ordering of the software events 114, 116, and 118.

However, there are many other examples as to how an incorrect ordering may occur. For example, electronically-enabled "smart shelves," associated with the readers 108, 110, or 112, may be used to track the presence of the item 102 on the shelf for retail sale or other purpose. Such shelves may report the addition of the item 102 as soon as the item 102 is added to the shelf. However, when the item 102 is already on the shelf, a customer may remove the item 102 for inspection, but then decide not to purchase the item 102. To avoid false determinations of customer purchase, the smart shelf may delay reporting of removal of the item 102. However, since re-placement of the item 102 by the customer results in an immediate reading of an added item, the consequence of a customer inspection of an item may be that the smart shelf reports an addition of the item 102 as a new item, prior to reporting removal of the item 102.

As another example, the event-handling software 125, as referred to above, may delay reporting of the software events 116 and 118, in order to include both in a batch report. Also, other processing may occur independently of the event-handling software 125, and may impart associated delays in reception of the software events 116 and 118 at the information system 120.

Moreover, although the event-handling software 125 is shown in FIG. 1 as performing batch processing of software events 116 and 118 from the plurality of readers 110 and 112, it should be understood that such batch processing also may occur at the level of software associated with the reader(s) 110, 112 themselves. For example, the reader 110 may accumulate multiple software events 116 for a designated period of time, in order to, for example, optimize transmission or other overhead associated with the software events 116.

In order to correctly order and interpret the software events 114, 116, and 118, the event interpretation system 128 includes a delay determination system 132 that is operable to determine a delay period or delay time associated with the software events 114, 116, and 118, and/or with readers 108, 110, and 112. The appropriate delay time for each incoming software event is accessed by a stored software events database 134, which receives the software events 114, 116, and 118 and stores them for a time period that is equal to the determined delay time.

After the delay time associated with a particular software event has passed, a sorter 136 accesses that event from the database 134, and inserts the event into an event queue 138 in the appropriate order (that is, in an order corresponding to an actual order of occurrence of physical events 106).

As a result, an association model 140 of the event interpretation system 128 receives the software events 114, 116, and 118 from the event queue 138 in the correct order, and makes determinations about the meaning and effects of the various software events relative to the item 102. It should be understood that the association model 140 interacts with the state database 130 and/or various business logic and/or business processes (not shown) that may be associated with the information system 120. Examples of the latter include, for example, business rules regarding the re-ordering of the item 102 from inventory, shipping rules or pricing rules related to the item 102, or any other business rules that may be facilitated by the auto-id information that is provided by the readers 108, 110, and 112. Accordingly, the state database 130 may be properly updated by the event interpretation system 128.

As just described, the event interpretation system 128 delays interpretation of the software events 114, 116, and 118 for a delay time that accounts for any delays that may occur in the transmission of the software events 114, 116, and 118 from their respective readers 108, 110, and 112. Since the software events 114, 116, and 118 are held in the database 134 for a delay time selected to ensure that all events to be ordered have reached the event interpretation system 128, then the sorter 136 may insert the software events 114, 116, and 118 into the queue 138 with confidence that the events are ordered correctly.

In one implementation, the delay time may be determined based on a maximum delay time (Max Delay) associated with transmission of the software events 114, 116, and 118. For example, the maximum delay time for the system 100 of FIG. 1 may be determined to be 1 minute, and the software events 114, 116, and 118 may be transmitted at times 12:00:01, 12:00:02, and 12:00:03. Then, each of the software events 114, 116, and 118 may be stored at the database 134 with a time-stamp of a current receipt time plus the time Max Delay (i.e., plus 1 minute) before being sorted according to their respective transmission times and inserted by the sorter 136 into the queue 138.

Thus, it may occur that the software events 116 and 118 are transmitted very quickly and arrive at the database 134 at 12:00:04 and 12:00:05, while the software event 114 experiences a maximum delay of 1 minute and arrives at the database 134 at 12:01:01. By waiting for the determined delay time, then, the sorter 136 does not attempt to sort the events 116 and 118 until 12:01:04 and 12:01:05, respectively, which times are after reception of the (delayed) software event 114. As a result, the software event 114 is appropriately recognized as occurring before the events 116 and 118.

In FIG. 1, software events are illustrated as being received at the database 134 before being inserted into the queue 138. However, it should be understood that software events may be put directly into the queue 138, and then held there for the delay time before being sorted and re-ordered by the sorter 136, for subsequent passage of those events to the association model 140. The event queue 138 may be ordered using an "insertion sort" technique, that may be implemented using known software or hardware techniques.

The time Max Delay may be determined by a number of techniques. For example, Max Delay may be calculated based on known information describing the network 122, the event-handling software 125, or other information impacting a delay of transmission of the software events 114, 116, and 118. In another example, Max Delay may be determined empirically by sending a number of test transmissions and timing the results.

In many implementations, there may be a minimum time period Min Delay necessary to transmit the software events 114, 116, and 118 to the event interpretation system 128. In this case, the time Min Delay may be subtracted from the time Max Delay to determine the delay time, since all of the software events 114, 116, and 118 will commonly experience Min Delay and it should therefore not impact a correct ordering of the events.

Similarly, it may be determined or assumed that software events from a single reader (e.g., the software events 114 from the reader 108) will not be received in an incorrect order. This is due to the fact that delays associated with, for example, the network 122 or the event-handling software 125, should not impact an order of readings performed by an individual one of the readers 108, 110, and 112.

Moreover, even if software events from a single reader arrive out of order with respect to one another, the time window for re-ordering such events may typically be relatively much smaller than the overall delay time based on Max Delay. As a result, events from a single reader may be re-ordered at a first level during the overall delay time based on Max Delay for the total number of readers.

The above assumptions related to the ordering of software events from a single reader may be used in association with a minimum time Min Move necessary to move the item 102 from one reader to another reader. Since this time is assumed to be constant, it also may be subtracted from the Max Delay time without impacting the accuracy of the sorter 136.

In short, examples of the delay time used by the delay determination system 132 include: Max Delay, Max Delay–Min Delay, and Max Delay–Min Delay–Min Move Delay. Of course, other examples also may be used for the delay time.

In implementing the delay time, the delay determination system 132 may be responsible for actually calculating the delay time, based on, for example, prevailing network conditions and/or other known information, or based on a maximum delay time of a recently-received plurality of software events. In other implementations, the delay determination system 132 may simply receive an externally-calculated delay time that is input by a user. In this example, the role of the delay determination system 132 is primarily to associate the appropriate delay time with the corresponding software events (and/or readers).

Figure 2:
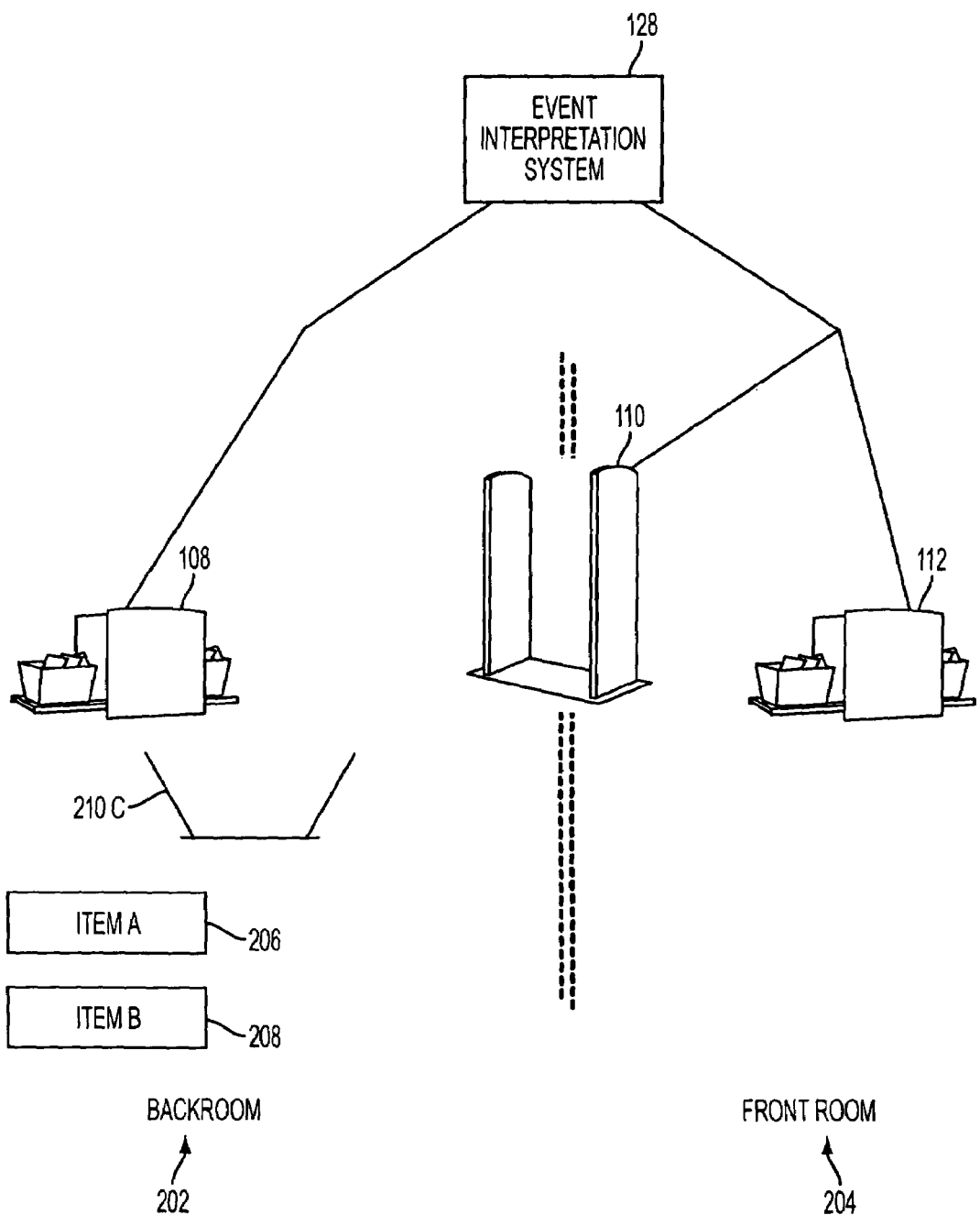
FIG. 2 is a diagram of a specific example of the auto-id system of FIG. 1.

FIG. 2 is a diagram of a specific example of the auto-id system 100 of FIG. 1. More specifically, FIG. 2 illustrates a retail sales environment that includes a backroom 202, where items are stored for sale, and a front room 204, where the items are placed for actual purchase by consumers. In FIG. 2, the backroom 202 contains the reader 108, and tagged items include an item A 206 and an item B 208, which are to be placed into a container C 210 for transport to the front room 204 through the reader 110. Then, in the front room 204, the items 206 and 208 may be read by the reader 112 for placement upon shelves or other display setting.

In FIG. 2, it is assumed that the reader 110 is a case-level reader monitoring a door between the backroom 202 and the front room 204. That is, the reader 110 is designed to monitor case-level tags such as a tag located on the container C 210. In this case, the reader 110 would not typically monitor item-level tags such as the tags located on items 206 and 208.

Figure 3A:
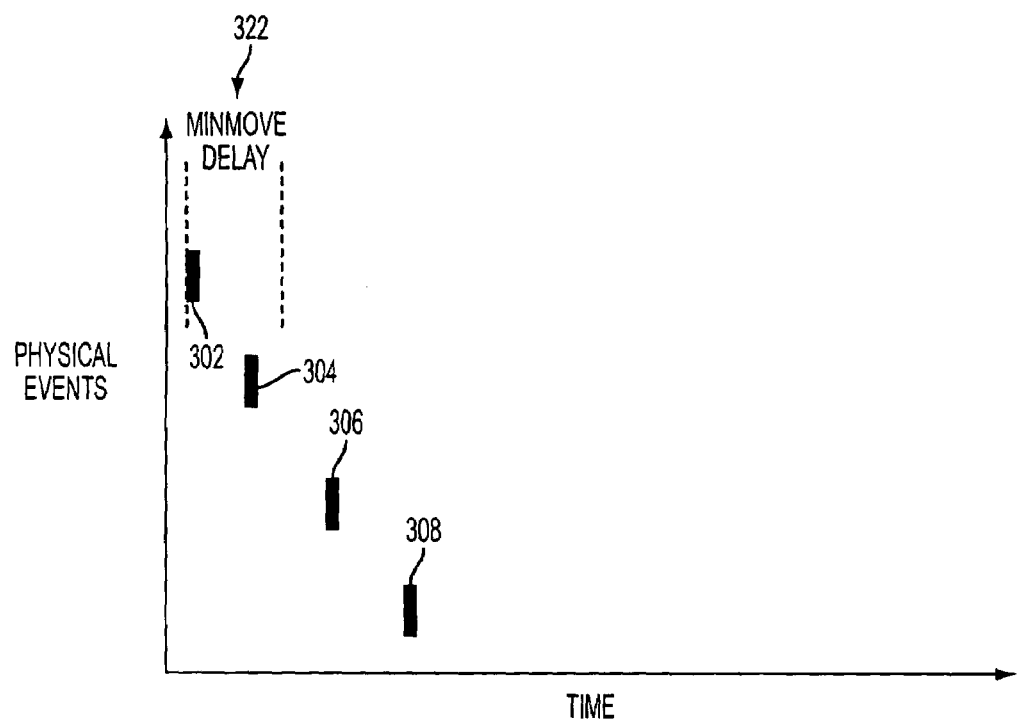
FIGS. 3A and 3B are timing diagrams of physical and software events associated with an operation of the auto-id system of FIG. 2.
Figure 3B:
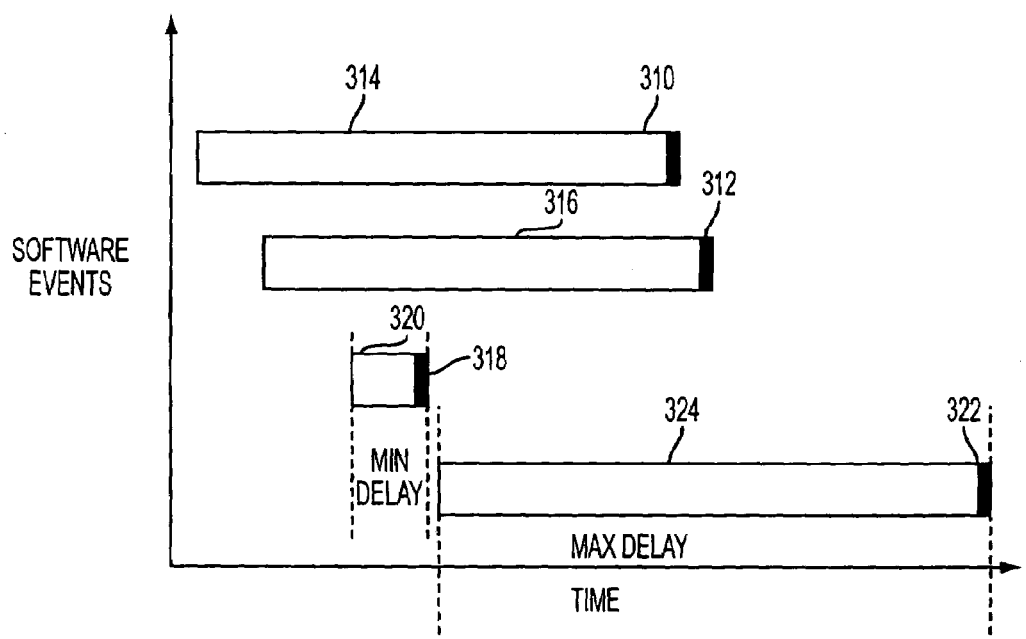

FIGS. 3A and 3B are timing diagrams of physical and software events associated with an operation of the auto-id system of FIG. 2. In FIG. 3A, a first physical event 302 corresponds to placement of the item A 206 into the container 210, while a second physical event 304 corresponds to placement of the item B 208 into the container 210. It should be understood that these physical events 302 and 304 occur in order, and are captured by the reader 108.

A physical event 306 corresponds to the transport of the container 210 through the reader 110. Finally, a physical event 308 corresponds to an unpacking of the item A 206 from the container 210, as detected by the front room reader 112.

As should be clear from the above discussion of FIG. 1, the physical events 302, 304, 306, and 308 correspond to generated software events. These software events are transmitted to the information system 120 for interpretation by the event interpretation system 128, but may be delayed during that transmission, due to a variety of factors, by a pre-determined maximum delay time Max Delay.

In one scenario, for example, a software event corresponding to the physical event 304 may conceivably arrive at the event interpretation system 128 before the software event corresponding to the physical event 302. That is, unless the delay time is considered, the event interpretation system 128 may determine that the item B 208 was placed into the container C 210 before the item A 206. However, it should be understood that such a mistake would probably have little or no impact on determining a current state of the items 206 and 208.

As another example, it may be that software events corresponding to physical events 302 and 304 may be received first and in correct order (likely since these events both originate at the same reader 108), but that a software event corresponding to the physical event 308 arrives before a software event corresponding to the physical event 306. In other words, it may be appear that the item A 206 may appear to have been unpacked in the front room 204, before it has even been transported from the backroom to the front room 204 (through the reader 110). Since the item A 206 would then appear to be in two places at once, at least momentarily, a re-ordering by the event interpretation system 128 would be necessary to avoid system inaccuracies and/or a system exception.

A final example of incorrect ordering due to transmission delays is illustrated in FIG. 3B. In FIG. 3B, a software event 310 corresponds to the physical event 302 of placing the item A 206 into the container C 210, while the software event 312 corresponds to the physical event 304 of placing the item B 208 into the container C 210. It should be noted that the software events 310 and 312 experience a delay 314 and a delay 316, respectively, but nevertheless arrive at the event interpretation system 128 in a correct order (i.e., with event 310 arriving prior to event 312).

Also in FIG. 3B, a software event 318 corresponding to the physical event 306 arrives after a delay 320, while a software event 322 corresponding to the physical event 308 arrives after a delay 324. It can be seen in FIG. 3B that the software event 318 arrives before the software events 310, 312, and 318, while the software event 322 is received in its proper order (i.e., last).

In this case, since the software event 318 arrives first and simply indicates that the container C 210 has been moved from the backroom 202 to the front room 204, it may be (erroneously) processed without exception. Subsequently, however, the software events 310 and 312 would seem to indicate that the items 206 and 208 are being placed into the container C 210, which would cause an exception since items 206 and 208 would still appear to be in the backroom 202.

In short, FIGS. 3A and 3B and the associated examples illustrate the above points that transmission delays of software events may cause system exceptions if the software events are not re-ordered correctly by the event interpretation system 128. Accordingly, in FIG. 3B, a Max Delay time is determined to be equivalent to the delay 324 of the software event 322. Meanwhile, a Min Delay time is determined to be equivalent to the delay 320 of the software event 318. Using these values and/or other information, a delay time may be set for holding the various software events in their received order of 318, 310, 312, and 322, so that they may be re-ordered into their actual order of 310, 312, 318, and 322.

Although, in the example of FIG. 3B, the Max Delay time and Min Delay time happen to be equivalent to actual delay times 324 and 320 of software events 322 and 320, it should be understood that the Max Delay time may be longer than a current maximum delay time of any particular group of software events. Similarly, the Min Delay time may be shorter than a current minimum delay time of any particular group of software events.

In FIG. 3A, a Min Move delay time is illustrated that, as explained above, corresponds to a minimum time necessary to move the container C 210 from the backroom 202 to the front room 204. Accordingly, a delay time used by the delay determination system 132 may be, for example, (a) Max Delay (b) Max Delay–Min Delay, or (c) Max Delay–(Min Delay+Min Move Delay).

Selection of one of these delay times may depend on several factors. For example, if an event interpretation is not particularly time-sensitive, or if the Max Delay dominates the factors Min Delay and Min Move Delay, then the Max Delay may simply be used as the delay time.

On the other hand, as already pointed out, a time window for holding incoming events within the database 134 may be reduced by subtracting Min Delay and/or Min Move Delay from Max Delay to determine the delay time. For example, a driver of a forklift in a warehouse may receive directions based on an RFID tag on a pallet. In this case, it would be desirable to provide directions to the driver as soon as possible, so as to maintain an efficiency and safety of the driver.

In deciding to use a particular delay time, practical considerations regarding the nature of the situation at hand may be useful. For example, in a single building and with no intervening software layers (e.g., without the event-handling software 125), the time to physically move an object may dominate the transmission delay times, and may cause the time Min Move to be used as the delay time. That is, the Max Delay time would primarily be caused or determined by the Min Move time, and not by delays associated with electronic communications between the readers 108, 110, 112 and the event interpretation system 128.

In particular, it may be the case that the physical event 106 of FIG. 1 corresponds to moving (driving) the item 102 across a distance of several miles or more, i.e., the reader 110 may be located several miles from the reader 108. In this case, the Max Delay time would be set by the time needed to transport the item 102, since this time would dominate the delay times associated with transmission of the software events and the Min Move delay time.

However, in such an implementation involving multiple geographic sites (e.g., where the reader 108 and the reader 110 are located at different geographic sites), the total delay time (i.e., time required to hold events in the database 134), would be relatively long for all events. In this case, in some implementations, multiple sets of delay times may be chosen and optimized for each geographical site, and then the sets may be ordered relative to one another, using the delay for transporting the item between the sites. Such implementations may be considered to have multiple layers of delay calculations and ordering information. That is, each geographic site may represent a first layer, while events related to transportation between the sites may be considered to be a separate layer.

Figure 4:
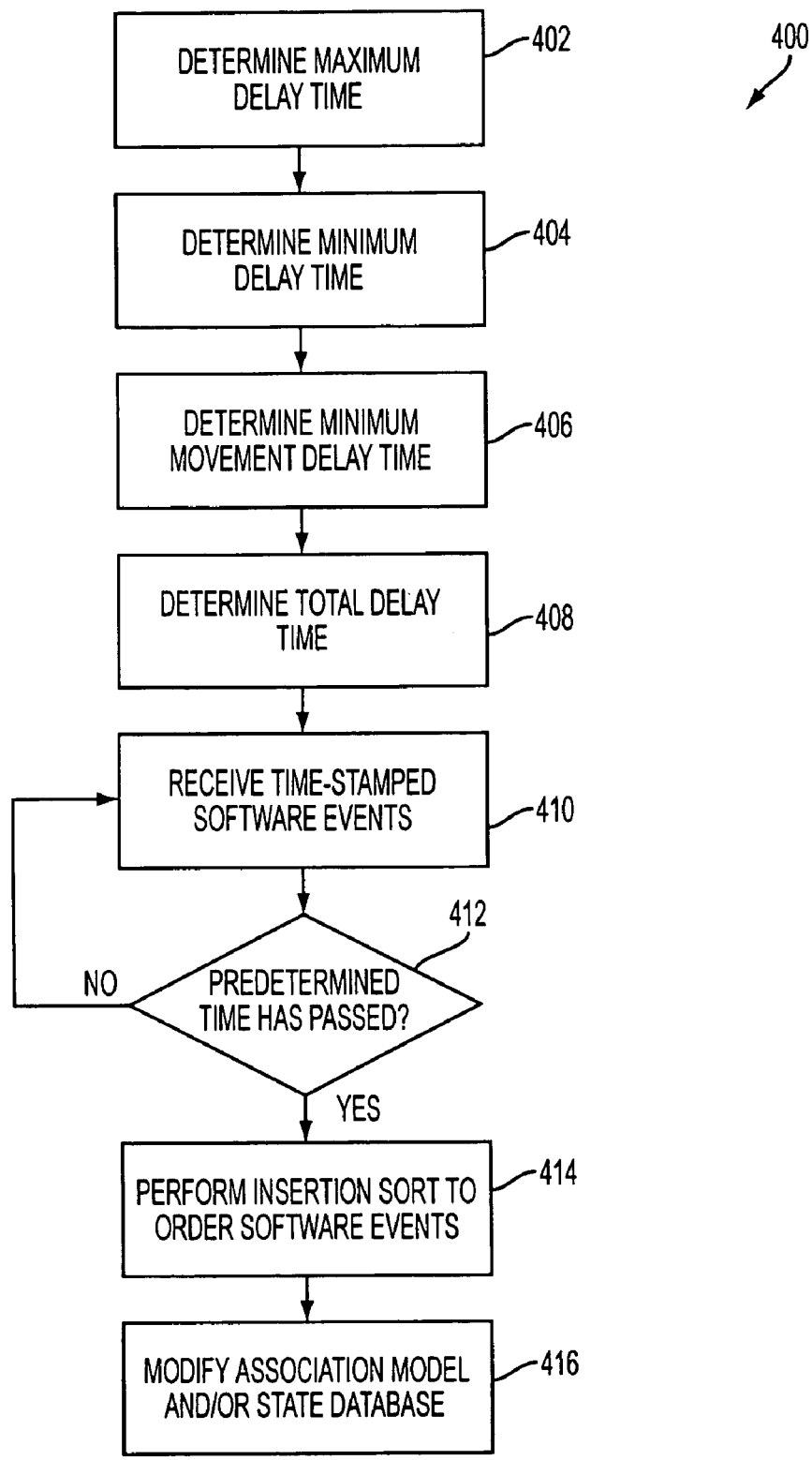
FIG. 4 is a flowchart illustrating a process for operating the auto-id systems of FIGS. 1 and 2.

FIG. 4 is a flowchart illustrating a process for operating the auto-id systems of FIGS. 1 and 2. In FIG. 4, a maximum delay time Max Delay is determined (402), followed by a minimum delay time Min Delay (404) and a minimum time to move items between readers (406). Based on one or more of these factors, a total delay time is determined by, and/or received by, the delay determination system 132 of FIG. 1 (408).

As software events are received at the event interpretation system 128 (410), the delay determination system 132 adds the delay time to the timestamp of each event for storage in the database 134 (or event queue 138). Based on the modified time stamp, the sorter determines whether the delay (holding) time has passed (412). If not, then the event interpretation system 128 continues to receive software events (410) (or simply waits if no software events are being received). If the delay time has passed for a particular software event, then that event is inserted in order into (or within) the event queue 138 (414).

Then, the software events are passed in order from the event queue 138 to the association model 140, where the events are interpreted based on all available information (416), including, for example, the order of the events, state information from the state database 130, business logic or processes associated with the information system 120, or other information. In this way, the association model 140 and the state database 130 are accurately and promptly maintained, with little or no need for human intervention.

Based on the above, it should be understood that system exceptions in an auto-id item tracking system may be reduced by re-ordering software events associated with the tracking of items. Accordingly, an accuracy and reliability of the item tracking system may be improved. Moreover, the item tracking system may be operated with a minimum of human intervention, so that the system may be operated efficiently and inexpensively.

A number of implementations have been described. Nevertheless, it will be understood that various modifications may be made. Accordingly, other implementations are within the scope of the following claims.

What is claimed is:

1. A method comprising:
   receiving first and second events associated with first and second states of an item, respectively, each event including an event timestamp indicative of a transmission or receipt time;
   adding, for each of the received first and second events, a delay time to the event timestamp, thereby associating a modified timestamp with each of the received first and second events;
   storing the first and second events for a duration based on the modified timestamps associated with each of the first and second events, respectively;
   sorting the stored first and second events based on the event timestamp for each of the first and second events; and
   interpreting the sorted first and second events.

2. The method of claim 1, further comprising:
   reading a tag associated with the item when the tag is within a predetermined operating range;
   generating the first event based on reading the tag; and
   transmitting the generated first event.

3. The method of claim 1, further comprising batch processing the first and second event.

4. The method of claim 1, further comprising determining the delay time associated with the first and second events.

5. The method of claim 4, wherein the delay time is determined based on a maximum delay time MaxDelay associated with transmission of the first and second events.

6. The method of claim 5, wherein the maximum delay time MaxDelay is determined based on known information describing a network, based on timing a test transmission, based on prevailing network conditions, based on a maximum delay time of a recently-received event, or based on an externally calculated delay time.

7. The method of claim 5, wherein the delay time is further determined based on a minimum delay time MinDelay associated with a minimum time period to transmit the first and second events.

8. The method of claim 7, wherein the delay time is determined based on subtracting the minimum delay time MinDelay from the maximum delay time MaxDelay.

9. The method of claim 7, wherein the delay time is further determined based on a minimum move time MinMove associated with a minimum time to move the item.

10. The method of claim 9, wherein the delay time is determined based on subtracting the minimum delay time MinDelay and the minimum move time MinMove from the maximum delay time MaxDelay.

11. The method of claim 1, wherein sorting the stored first and second events further comprises respectively inserting the first and second events into an event queue in an order based on the event timestamp.

12. The method of claim 1, wherein interpreting the sorted first and second events further comprises comparing the first and second events to a business logic.

13. The method of claim 12, wherein the business logic models business rules regarding the re-ordering of the item from inventory, or shipping rules or pricing rules related to the item.

14. The method of claim 1, wherein the delay time accounts for delays that occur in the transmission of the first and second events.

15. The method of claim 1, further comprising accessing a state database, wherein the sorted first and second events are interpreted based on accessing the state database.

16. A computer program product, tangibly embodied in a machine-readable medium, the computer program product comprising instructions that, when read by a machine, cause a data processing apparatus to:
- receive first and second events associated with first and second states of an item, respectively, each event including an event timestamp indicative of a transmission or receipt time;
- add, for each of the received first and second events, a delay time to the event timestamp, thereby associating a modified timestamp with each of the received first and second events;
- store the first and second events for a duration based on the modified timestamps associated with each of the first and second events, respectively;
- sort the stored first and second events based on the event timestamp for each of the first and second events; and
- interpret the sorted first and second events.

17. An apparatus comprising:
an event interpretation module configured to:
- receive first and second events associated with first and second states of an item, respectively, each event including an event timestamp indicative of a transmission or receipt time, and
- add, for each of the received first and second events, a delay time to the event timestamp, thereby associating a modified timestamp with each of the received first and second events;
a stored software events database configured to store the first and second events for a duration based on the modified timestamps associated with each of the first and second events, respectively;
a sorter configured to sort the stored first and second events based on the event timestamp for each of the first and second events; and
an association model configured to interpret the sorted first and second events.

18. A computer-implemented method comprising:
reading a tag associated with an item using a Radio Frequency Identification (RFID) reader when the tag is within a predetermined operating range of the RFID reader;
generating first and second events respectively associated with first and second states of the item based on reading the tag, each event including an event timestamp indicative of a transmission time by the RFID reader;
receiving the first and second events;
batch processing the first and second events;
determining a delay time associated with the first and second events, the delay time accounting for delays that occur in the transmission of the first and second events;
adding, for each of the received first and second events, a delay time to the event timestamp, thereby associating a modified timestamp with each of the received first and second events;
storing the first and second events for a duration based on the modified timestamps associated with each of the first and second events, respectively;
sorting the stored first and second events based on the event timestamp for each of the first and second events, by inserting the first and second events into an event queue in an order based on the event timestamp; and
interpreting the sorted first and second events by comparing the sorted first and second events to a business logic that models business rules regarding the re-ordering of the item from inventory, or shipping rules or pricing rules related to the item,
wherein the delay time is determined as expressed as:

$$MaxDelay - (MinDelay + MinMove),$$

wherein MaxDelay represents a maximum delay time associated with transmission of the first and second events, and is determined based on known information describing a network, based on timing a test transmission, based on prevailing network conditions, based on a maximum delay time of a recently-received event, or based on an externally calculated delay time, wherein MinDelay represents a minimum delay time associated with a minimum time period to transmit the first and second events, and wherein MinMove represents a minimum move time associated with a minimum time to move the item.

* * * * *